(12) United States Patent
Stroissnigg et al.

(10) Patent No.: US 9,879,734 B2
(45) Date of Patent: Jan. 30, 2018

(54) TORQUE COUPLING

(75) Inventors: Horst Stroissnigg, Puergen (DE);
Erwin Manschitz, Germering (DE);
Manfred Ludwig, Landsberg (DE);
Werner Kaibach, Kaufering (DE);
Manfred Schallert, Nenzing (AU);
Franz Moessnang, Stadtbergen (DE);
Ferdinand Kristen, Gilching (DE)

(73) Assignee: Hilti Aktiengesellschaft, Schaan (LI)

( * ) Notice: Subject to any disclaimer, the term of this patent is extended or adjusted under 35 U.S.C. 154(b) by 959 days.

(21) Appl. No.: 13/508,492

(22) PCT Filed: Nov. 2, 2010

(86) PCT No.: PCT/EP2010/066612
§ 371 (c)(1),
(2), (4) Date: Jun. 14, 2012

(87) PCT Pub. No.: WO2011/054807
PCT Pub. Date: May 12, 2011

(65) Prior Publication Data
US 2012/0252585 A1 Oct. 4, 2012

(30) Foreign Application Priority Data
Nov. 6, 2009 (DE) .................... 10 2009 046 475

(51) Int. Cl.
*F16D 7/04* (2006.01)

(52) U.S. Cl.
CPC .................. *F16D 7/048* (2013.01)

(58) Field of Classification Search
CPC ........................................ F16D 41/12
USPC .................. 464/37, 101; 192/56.1, 56.2
See application file for complete search history.

(56) References Cited

U.S. PATENT DOCUMENTS

| | | | | |
|---|---|---|---|---|
| 415,653 | A * | 11/1889 | Racine | 464/37 |
| 1,818,690 | A * | 8/1931 | Carlson | |
| 1,865,559 | A * | 7/1932 | De Montgrand | 464/37 X |
| 2,322,608 | A * | 6/1943 | Webster | 464/37 |
| 2,551,718 | A * | 5/1951 | Auten | 464/37 X |
| 2,637,987 | A * | 5/1953 | Hill et al. | 464/37 |
| 2,818,950 | A * | 1/1958 | Harless | |
| 3,115,788 | A * | 12/1963 | Siefert | |
| 3,593,542 | A * | 7/1971 | Urayama | 464/37 |
| 4,043,437 | A * | 8/1977 | Taylor | 464/37 X |
| 4,287,974 | A * | 9/1981 | Krejci | 464/37 X |
| 4,970,998 | A | 11/1990 | Tyler | |
| 5,672,110 | A * | 9/1997 | Kurita et al. | 464/37 |
| 2002/0162720 | A1 * | 11/2002 | Kimura et al. | 464/37 X |
| 2009/0145718 | A1 * | 6/2009 | Chiesa et al. | |

FOREIGN PATENT DOCUMENTS

| | | |
|---|---|---|
| CH | 662868 | 10/1987 |
| DE | 59 456 | 10/1891 |
| DE | 8 20 659 | 11/1951 |
| DE | 199 29 833 A | 1/2001 |

(Continued)

*Primary Examiner* — Matthieu F Setliff
(74) *Attorney, Agent, or Firm* — Davidson, Davidson & Kappel, LLC

(57) ABSTRACT

The torque coupling has a shaft, a hollow shaft and a plurality of levers. The bearings of the levers are non-rotatably connected to the shaft and the levers are spring-loaded so as to be pressed against the hollow shaft. The levers are bent from a steel strip.

6 Claims, 1 Drawing Sheet

(56) References Cited

FOREIGN PATENT DOCUMENTS

| | | | |
|---|---|---|---|
| DE | 10 2008 029578 A1 | 12/2009 | |
| DE | 10 2008 064153 | 7/2010 | |
| GB | 2257493 A * | 1/1993 | ............ 464/37 |
| JP | 2000 1 70 798 | 6/2000 | |
| JP | 2002 005 201 A | 1/2002 | |

* cited by examiner

TORQUE COUPLING

BACKGROUND

The present invention relates to a torque coupling as known, among other things, from German laid-open document DE 199 29 833 A.

Torque couplings are subject to a great deal of wear and tear during operation. In particular, the running surfaces of the hollow wheel and the clamped elements that engage with the running surface tend to wear out.

SUMMARY OF THE INVENTION

It is an object of the present invention to provide a torque coupling that is less prone to wear and tear.

The torque coupling according to the invention has a shaft, a hollow shaft and a plurality of levers. The bearings of the levers are non-rotatably connected to the shaft and the levers are spring-loaded so as to be pressed against the hollow shaft. The levers are bent from a steel strip. In long-term tests, the bent steel strip proves to be less prone to wear and tear than levers that are made of a solid piece of the same material. A possible explanation for this is seen in the lower surface roughness stemming from the different production methods. The relatively lesser inertia could also translate into less stress in the case of dynamic load changes. The levers can be bent from spring steel.

In one embodiment, a contact area of the hollow shaft having the levers is lined with a bent steel strip.

In one embodiment, the levers have a bearing head that is bent to form a circular segment and said bearing head is placed movably into a bearing receptacle made of plastic. The plastic can be, for example, fiber-reinforced.

BRIEF DESCRIPTION OF THE DRAWINGS

The description below explains the invention on the basis of embodiments and figures provided by way of examples. The figures show the following.

DETAILED DESCRIPTION

Figure 1:
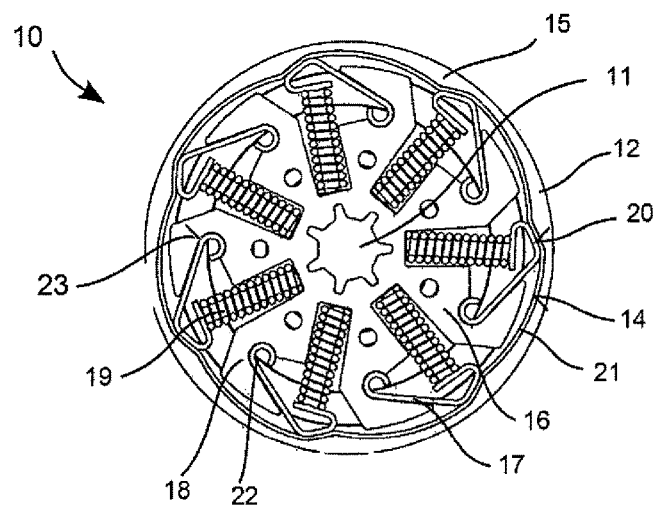
FIG. 1 a top view of a torque coupling.
Figure 2:
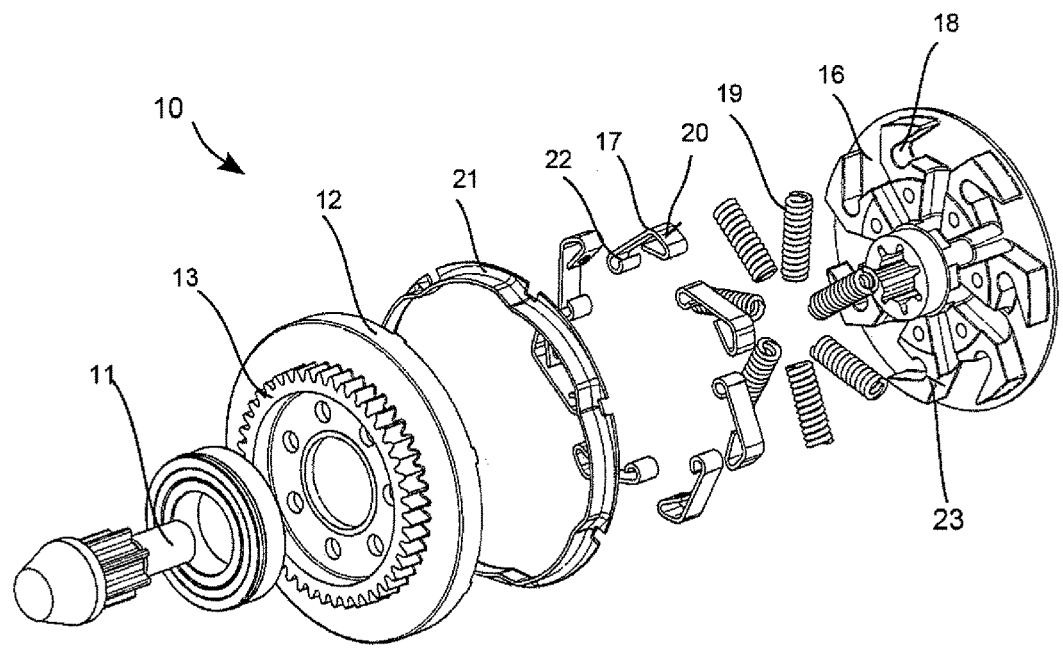
FIG. 2 an exploded view of the torque coupling.

FIG. 1 shows an embodiment of a torque coupling 10 by way of an example; FIG. 2 is an exploded view of the torque coupling 10. The torque coupling 10 comprises a shaft 11 and a hollow shaft 12. The shaft 11 can have a star-shaped cross section. A gear wheel 13 can be attached to the hollow shaft 12 or else an outer circumference of the hollow shaft 12 can be configured as a gear wheel 13. An inside 14 of the hollow shaft 13 is profiled. The profile can be formed, for example, by several projections 15 that protrude in the radial direction with respect to the shaft 11.

The shaft 11 has a hub 16. The hub 16 has several levers 17 that are rotatably attached to the hub 16. Springs 19 deflect the levers 17 in the radial direction against the inside 14 of the hollow shaft 12.

A torque transmission between the shaft 11 and the hollow shaft 12 takes place via the spring-loaded levers 17 that engage with the profiled inside 14 of the hollow shaft 12. The torque transmission is limited by the spring strength of the springs 19 and by the design of the projections 15. If an applied torque exceeds a threshold value, the levers 17 are pressed by the projections 15 towards the shaft 12 against the force of the springs 19, and the shaft 11 rotates with respect to the hollow shaft 12.

During the free-running of the torque coupling 10, the outer surfaces 20 of the levers 17 rub along the inside 14 of the hollow shaft 12. The abrasion that occurs in this process limits the service life of the torque coupling 10. The levers 17 are made of a piece of spring steel band. It is possible to reduce the abrasion with the levers 17 that are bent from the steel band. It is assumed that the rolled surface of the bent levers has a lower surface roughness than conventionally produced levers. Moreover, the favorable fiber orientation of the steel band could also be a reason for the lesser abrasion. The inside 14 of the hollow shaft 12 is preferably lined with a shaped piece of sheet metal 21. The lined inside 14, like the above-mentioned levers 17, proves to be less prone to wear and tear.

The bearings 18 for the levers 17 are preferably made of plastic. The bearing head 22 of the levers 17 is bent so as to have a circular segment-like cross section. The bearing receptacle 23 made of the plastic likewise has a circular segment-like cross section in which the bearing head 22 can be inserted. In contrast to the attachment of the levers 17 by means of a pin, especially a pin made of metal, a considerable reduction of the friction could be achieved here since the wear and tear of the plastic bearing turns out to be less than that of an attachment using a metal pin.

The invention claimed is:

1. A torque coupling comprising:
a shaft;
a hollow shaft;
a plurality of levers; and
bearings for the levers, the bearings non-rotatably connected to the shaft, the levers being spring-loaded so as to be pressed against the hollow shaft, the levers being shaped from a steel strip, wherein the levers have a bearing head bent to form a circular segment, the bearing head placed movably into a bearing receptacle made of non-metallic materials.

2. The torque coupling as recited in claim 1 wherein the levers are shaped from spring steel.

3. The torque coupling as recited in claim 1 further comprising a shaped steel strip lining the hollow shaft at a contact area with the levers.

4. The torque coupling as recited in claim 1 wherein the bearing receptacle is made of plastic or ceramic.

5. The torque coupling as recited in claim 1 wherein the levers are spring-loaded by coil springs.

6. The torque coupling as recited in claim 5 wherein the coil springs deflect the levers against an inside of the hollow shaft.

* * * * *